April 3, 1945. P. ORR 2,372,733
TRANSMISSION
Filed Sept. 2, 1942
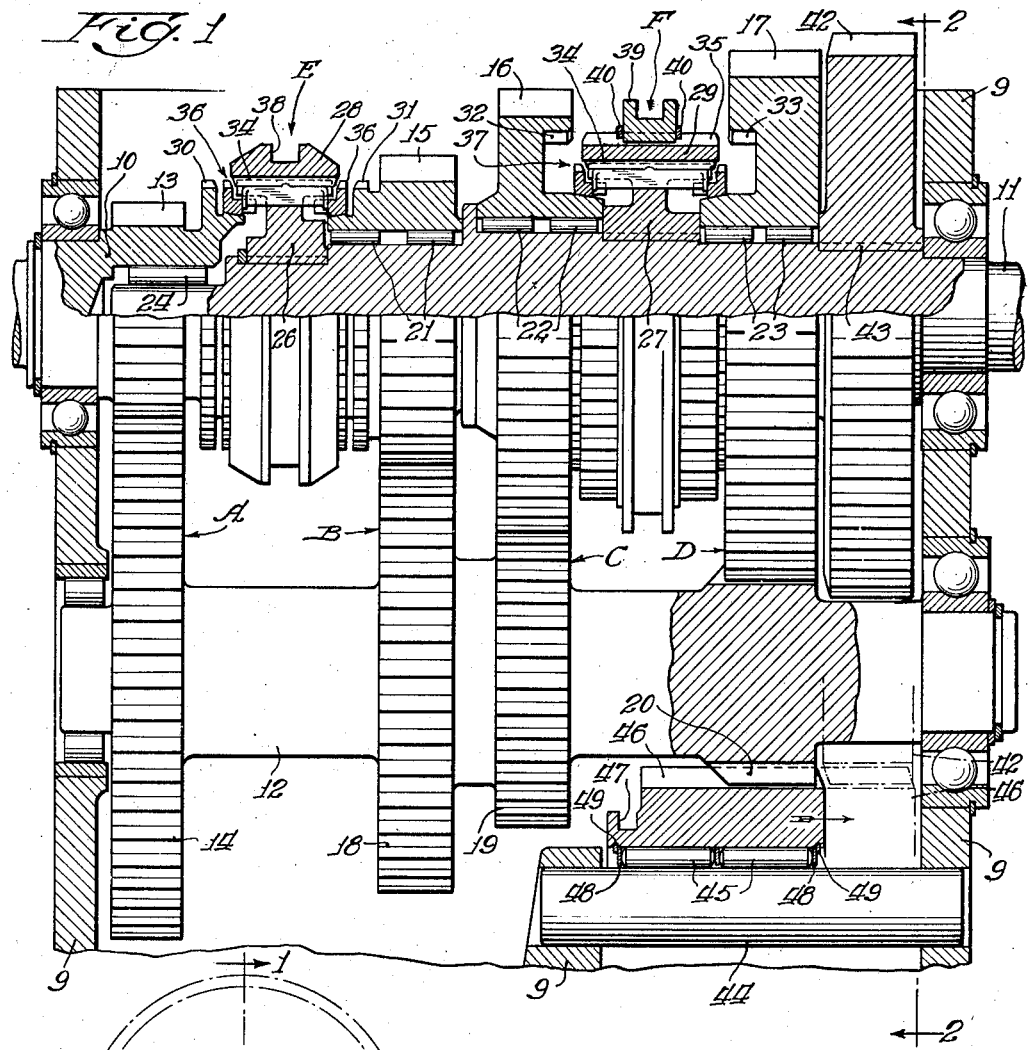
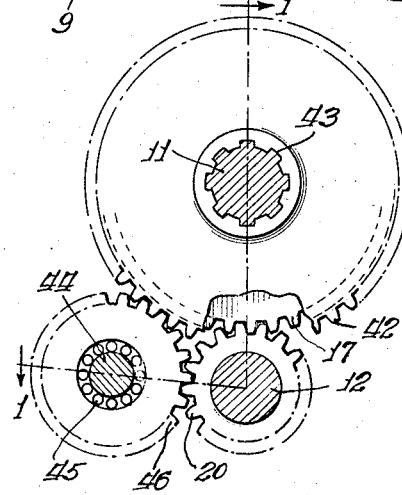
Inventor:
Palmer Orr
By Edward C. Fitzhaugh
Atty.

Patented Apr. 3, 1945

2,372,733

UNITED STATES PATENT OFFICE 2,372,733

TRANSMISSION

Palmer Orr, Muncie, Ind., assignor to Borg-Warner Corporation, Chicago, Ill., a corporation of Illinois Application September 2, 1942, Serial No. 456,972

1 Claim. (Cl. 74—355)

This invention relates to change-speed transmissions and has as its general object to provide a four-speed transmission of the countershaft, constant mesh gear type.

Another object of the invention is to provide a simple yet efficient transmission of the type indicated, and one which is axially compact.

Another object of the invention is to provide a transmission, which in addition to four forward speeds, provides for a reverse drive, employing a minimum number of gears and a construction of maximum simplicity and ruggedness to achieve this object.

Other objects, the advantages and uses of the invention will become more apparent after reading the following specification and claim, and after consideration of the drawing forming a part of the specification wherein:

Fig. 1 is a side elevation, partially in section, of a transmission embodying the invention, taken as indicated by the line 1—1 of Fig. 2; and Fig. 2 is a transverse sectional view of the same taken as indicated by the line 2—2 of Fig. 1.

As an example of one form in which the invention may be embodied, I have shown in the accompanying drawing a four-speed transmission adapted for use in motor trucks, comprising generally a housing 9, a drive shaft 10, a driven shaft 11, and a countershaft 12 journalled therein, a first train of gears A for providing a drive from the drive shaft 10 to the countershaft 12, and second, third and final gear trains B, C and D respectively for providing drives of varying ratios from the countershaft to the driven shaft 11.

The gear train A includes a pinion 13 fixed to the drive shaft 10 and a gear 14 fixed to the countershaft 12 and meshing with the pinion 13. The gear trains B, C and D include a pinion 15 and gears 16 and 17 journalled upon the driven shaft 11 and meshing respectively with a gear 18 and pinions 19 and 20 fixed to the countershaft 12. Bearings 21, 22 and 23 respectively are interposed between the pinion 15 and gears 16 and 17 and the driven shaft 11. The forward end of the driven shaft 11 is piloted as at 24 in the rear end of the drive shaft 10.

For establishing the various forward drives, I provide a pair of two-way clutch mechanisms E and F respectively, comprising hub members 26, 27 respectively, splined to the driven shaft 11, slidable clutch sleeves 28, 29 respectively, drivingly connected to and axially slidable on the rims of the hub members 26, 27, and jaw clutch teeth 30, 31, 32 and 33 respectively, fixed to the pinions 13 and 15 and gears 16 and 17 respectively, and adapted to be engaged by the clutch teeth 34, 35 of the shiftable jaw clutch sleeves 28, 29 respectively. The internal teeth 34 of each sleeve mesh with corresponding external teeth on the hub members 26, 27 in order to provide the above-mentioned slidable driving engagement between the sleeves and the hub members.

Between the shiftable jaw clutch sleeves 28 and 29 respectively, I interpose synchronizing mechanism of the type shown in U. S. Patent No. 2,221,900, issued November 19, 1940, in the name of S. O. White and Bruce Barr. Such mechanism is indicated generally at 36 and 37 respectively, and functions to synchronize the jaw clutch sleeve 28, 29 with the members into which they are being moved into engagement, just prior to such engagement.

For shifting the clutch sleeve 28, a groove 38 is provided in the periphery of the sleeve and for shifting the sleeve 29, a channeled ring 39 having internal teeth meshing with the teeth 35, is secured on the periphery of the sleeve 29 by snap rings 40. In this manner the external teeth 35 may be formed in a simple external gear hobbing operation, the channel 39 being attached subsequently. By employing external teeth 35 it is possible to form the cooperating clutch teeth 32 and 33 internally of the gears 16 and 17, thus decreasing the distance between the gears 16 and 17.

Between the rear wall of the housing 9 and the final gear train D, I interpose a reverse gear 42 which is splined as at 43 to the driven shaft 11. Mounted in the frame 9 is a short idler shaft 44 on which is journaled, through the medium of bearings 45, a reversing idler 46 which is constantly in mesh with the pinion 20 of the final gear train D and is of sufficient length to remain in mesh therewith while being slid axially into mesh with the reverse gear 42. This latter position is indicated in dotted lines in Fig. 1.

The reversing idler 46 is provided with a groove 47 adapted to receive a shift fork by means of which the idler may be shifted axially on the shaft 44.

The bearing rollers 45 are retained within the bore of the idler 46 by retaining washers 48 which in turn are retained by snap rings 49 seated in internal grooves in the idler 46. Thus as the idler is shifted axially the bearings 45 will be carried along with it, sliding upon the shaft 44.

In the operation of the transmission, drive is transmitted from the drive shaft 10 to the countershaft 12 through the pinion 13 and gear 14 of the first gear train A. Low gear is obtained by shifting clutch sleeve 28 into neutral and the clutch sleeve 29 into engagement with the clutch teeth 33 so as to connect the final gear train D to the driven shaft 11. In a similar manner, second gear is obtained by leaving clutch sleeve 28 in neutral and shifting the sleeve 29 into engagement with the clutch teeth 32 so as to connect in the gear train C. Third speed forward is obtained by shifting clutch sleeve 29 into neutral and the clutch sleeve 28 into engagement with the teeth 31 so as to connect in the gear train B. Direct drive is obtained by leaving clutch sleeve 29 in neutral and shifting the clutch sleeve 28 into engagement with the clutch teeth 30 of the drive shaft.

Reverse drive is obtained by shifting each of the clutch sleeves 28 and 29 to neutral position and thereafter shifting the reverse idler 46 into engagement with the reverse gear 42. Any conventional shifting linkage whereby this sequence of shifting operations may be obtained, may be employed for this purpose.

It has previously been proposed to provide an arrangement in which a gear is formed on the periphery of the clutch sleeve between the third and final gear train of a transmission of this general type, and in which a reversing idler, keyed to an idler shaft, is slidable into engagement with such gear so as to transmit drive to said gear from a train of gears fixed to the idler shaft and countershaft respectively. The present invention eliminates the necessity for this latter train of gears and also greatly simplifies and cheapens the construction of the rear jaw clutch sleeve by eliminating the necessity for forming a gear thereon, it being simpler to form a separate conventional gear and mount the same directly on the driven shaft, such mounting occupying no more axial space than would be occupied by the mounting of the gear on the clutch sleeve.

It has also been proposed to provide, in a transmission of the general type with which my invention deals, an arrangement wherein the final direct drive train is converted into a reversing train by means of a shiftable gear on the countershaft adapted in the direct drive position to clutch with the countershaft pinion of the final train and in the reverse drive position to mesh with one pinion of a reversing idler having another pinion meshing with the driven gear of the final train and at the same time to declutch the countershaft pinion of the final train, which later pinion is rotatably mounted on the countershaft.

My invention eliminates the necessity for providing a separate final gear train pinion on the countershaft, and the bearing for journalling the same thereon, and makes it possible to employ a conventional gear cluster in which all countershaft gears are integral. It also eliminates the necessity for jaw clutching mechanism in the countershaft assembly and provides for cutting in reverse gearing simply by meshing a single pair of toothed members. In addition, it eliminates the necessity for a double gear construction in the reversing idler and provides instead a very simple form of elongated pinion with continuous teeth.

While I have described my invention in connection with one specific embodiment thereof it is to be understood that this is by way of illustration and not by way of limitation and the scope of my invention is defined solely by the appended claim which should be construed as broadly as the prior art will permit.

I claim:

In a transmission, a frame, aligned driving and driven shafts, a countershaft, a plurality of gear trains including, in the order named, a first gear train for transmitting a drive from the driving shaft to the countershaft and second, third and fourth gear trains for transmitting drives of varying ratios from the countershaft to the driven shaft, a two-way jaw clutch interposed between the first and second gear trains for selectively connecting the driven shaft directly to the drive shaft or to the second gear train, a two-way jaw clutch interposed between the third and fourth gear trains for selectively connecting the driven shaft to either of said third and fourth trains, a reverse gear drivingly connected to the driven shaft between said fourth gear train and the frame, and a reverse idler meshing with the countershaft gear of said fourth train and slidable into mesh with said reverse gear while remaining in mesh with said countershaft gear, said reverse idler being mounted on an idler shaft for longitudinal movement thereon and having bearing rollers interposed between said idler and said idler shaft and encaged within said idler for longitudinal movement therewith on said idler shaft.

PALMER ORR.